(12) United States Patent
Shimizu et al.

(10) Patent No.: US 7,502,638 B2
(45) Date of Patent: Mar. 10, 2009

(54) ANTENNA DEVICE AND RADIO COMMUNICATION APPARATUS USING THE SAME

(75) Inventors: Mie Shimizu, Yokohama (JP); Kazunari Kawahata, Machida (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 436 days.

(21) Appl. No.: 11/463,615

(22) Filed: Aug. 10, 2006

(65) Prior Publication Data

US 2006/0293097 A1 Dec. 28, 2006

Related U.S. Application Data

(63) Continuation of application No. PCT/JP2005/002457, filed on Feb. 17, 2005.

(30) Foreign Application Priority Data

Mar. 4, 2004 (JP) ............................. 2004-060959

(51) Int. Cl.
*H04M 1/00* (2006.01)
(52) U.S. Cl. ................. 455/575.7; 455/562.1; 455/121; 343/750; 343/751
(58) Field of Classification Search ............... 455/562.1, 455/121, 129, 424, 425, 456.5, 456.6, 561, 455/550.1, 575.1, 63.4, 82, 83, 575.7, 107, 455/279.1; 343/702, 846, 700 MS, 895, 343/881, 700 R, 751, 750, 845, 850; 342/423, 342/434, 445, 74, 153
See application file for complete search history.

(56) References Cited

U.S. PATENT DOCUMENTS 4,268,805 A * 5/1981 Tanner et al. ............... 333/129

(Continued)

FOREIGN PATENT DOCUMENTS

JP 2002-009521 A 1/2002

(Continued)

OTHER PUBLICATIONS

Official communication issued in the corresponding International Application No. PCT/JP2005/002457, mailed on Jun. 14, 2005.

(Continued)

*Primary Examiner*—Duc Nguyen
*Assistant Examiner*—Charles Chow
(74) *Attorney, Agent, or Firm*—Keating & Bennett, LLP

(57) ABSTRACT

An antenna device includes a signal-band separating circuit that is interposed between a communication antenna and a ground portion that are disposed on a circuit board. The communication antenna is connected to a communication circuit by a signal line via a signal-band separating circuit. A telecast-receiving antenna is connected to a broadcast circuit by a signal line. The signal-band separating circuit transmits signals in a frequency band for communication between the communication antenna and the communication circuit, and transmits signals in a frequency band for telecasts between the communication antenna and the ground portion. The antenna length (electrical length) of the telecast-receiving antenna is extended by adding the antenna length of the communication antenna in addition to the antenna length of the ground portion, thereby improving the antenna gain during telecast reception.

16 Claims, 5 Drawing Sheets

U.S. PATENT DOCUMENTS

| | | | | |
|---|---|---|---|---|
| 4,850,034 | A | * | 7/1989 | Campbell .................... 455/74 |
| 5,089,829 | A | * | 2/1992 | Haruyama et al. .......... 343/852 |
| 5,258,728 | A | * | 11/1993 | Taniyoshi et al. ........... 333/132 |
| 5,815,804 | A | * | 9/1998 | Newell et al. ................. 455/78 |
| 6,140,966 | A | * | 10/2000 | Pankinaho ........... 343/700 MS |
| 6,255,994 | B1 | * | 7/2001 | Saito ................... 343/700 MS |
| 6,639,555 | B1 | * | 10/2003 | Kane et al. ............ 343/700 MS |
| 6,765,540 | B2 | * | 7/2004 | Toncich ...................... 343/860 |
| 6,864,841 | B2 | * | 3/2005 | Dai et al. .............. 343/700 MS |
| 6,933,893 | B2 | * | 8/2005 | Rubinshteyn et al. . 343/700 MS |
| 7,420,511 | B2 | * | 9/2008 | Oshiyama et al. ..... 343/700 MS |
| 7,446,709 | B2 | * | 11/2008 | Ishimiya .............. 343/700 MS |
| 2003/0137459 | A1 | * | 7/2003 | Kim et al. ................... 343/702 |
| 2003/0137463 | A1 | * | 7/2003 | Shimizu ..................... 343/713 |
| 2003/0145328 | A1 | * | 7/2003 | Rabinowitz et al. ........... 725/72 |
| 2004/0095463 | A1 | * | 5/2004 | Yabuta ....................... 348/61 |
| 2006/0017621 | A1 | * | 1/2006 | Okawara et al. ...... 343/700 MS |
| 2006/0158379 | A1 | * | 7/2006 | Ishimiya ..................... 343/741 |

FOREIGN PATENT DOCUMENTS

| | | | |
|---|---|---|---|
| JP | 2002-118482 | A | 4/2002 |
| JP | 2003-153111 | A | 5/2003 |
| JP | 2003-273620 | A | 9/2003 |
| JP | 2003-347815 | * | 12/2003 |
| JP | 2003-347815 | A | 12/2003 |
| JP | 2004-207880 | A | 7/2004 |

OTHER PUBLICATIONS

Official communication issued in the counterpart European Application No. 05710307.9, mailed on Apr. 11, 2007.

Official communication issued in the counterpart European Application No. 05710307.9, mailed on Jul. 20, 2007.

* cited by examiner

ANTENNA DEVICE AND RADIO COMMUNICATION APPARATUS USING THE SAME

BACKGROUND OF THE INVENTION

1. Field of the Invention

The present invention relates to antenna devices capable of transmitting/receiving information and capable of receiving broadcasts such as telecasts, and to radio communication apparatuses including such antenna devices.

2. Description of the Related Art

Cellular phones are in widespread use as radio communication apparatuses for transmitting and receiving information. Recently, cellular phones capable of receiving, visualizing, and auralizing telecasts have been proposed. Antenna devices capable of both communication (telephone calls) and telecast reception may have a structure as shown in FIG. 10.

An antenna device shown in FIG. 10 includes an antenna 90 capable of both receiving signals in a frequency band for telecasts and transmitting/receiving signals in a frequency band for telephone calls (communication). The antenna 90 is mounted on a circuit board 100. A branching filter 80, a communication circuit 120, and a broadcast circuit 130 are provided on the circuit board 100. The signals in the frequency band for communication are transmitted between the antenna 90 and the communication circuit 120 by the branching filter 80. The signals in the frequency band for telecasts received by the antenna 90 are transmitted to the broadcast circuit 130.

Examples of such known antennas are disclosed in Japanese Unexamined Patent Application Publication No. 2002-9521 (Patent Document 1), Japanese Unexamined Patent Application Publication No. 2003-273620 (Patent Document 2), and Japanese Unexamined Patent Application Publication No. 2003-347815 (Patent Document 3).

When transmission and reception of the signals in the frequency band for communication and reception of the signals in the frequency band for telecasts are performed using the common antenna 90, signal waves in both frequency bands for communication and telecasts interfere with each other. Moreover, for example, the signals in the frequency band for communication in the communication circuit 120 enter the broadcast circuit 130 from the communication circuit 120 via the branching filter 80 through a path W shown in the FIG. 10. The entrance of the signals in the frequency band for communication presents problems of reduction in gain (sensitivity) of the signals in the frequency band for telecasts and degradation of antenna characteristics.

Moreover, antennas are required to be smaller as cellular phones become smaller. In general, the length of antennas (electrical length of antennas) can be set to an optimum value (a quarter of the signal wavelength) in either the frequency band for telecasts or the frequency band for communication. However, it is difficult to appropriately transmit and receive signals in a wide frequency range including the frequency band for telecasts and the frequency band for communication using only one antenna.

Specifically, when transmission and reception of signals in the frequency band for communication and reception of signals in the frequency band for telecasts are performed, the frequencies of the signals in the frequency band for telecasts ranging from 470 to 770 MHz, for example, are lower than those of the signals in the frequency band for communication (for example, frequency band of 800 MHz to 2 GHz), and moreover, the frequency band for telecasts is wider than that for communication. Therefore, in order to support both high and low frequency bands, antenna characteristics that support a sufficiently wide frequency range of 470 MHz to 2 GHz are required. However, it is difficult to properly transmit and receive signals of all channels in such a wide frequency range using only one antenna.

Furthermore, when the antenna is configured both to transmit and receive the signals in the frequency band for communication and to receive the signals in the frequency band for telecasts, the size of the antenna 90 increases, and the apparatus (antenna device) cannot be made compact.

SUMMARY OF THE INVENTION

To overcome the problems described above, preferred embodiments of the present invention provide a compact antenna device that is capable of preventing interference between radio waves of signals in a frequency band for reception such as telecasts and radio waves of signals in a frequency band for communication, and a radio communication apparatus using the same. In addition, preferred embodiments of the present invention provide an antenna device that exhibits a high-gain (high-sensitivity) receiving antenna characteristic even when the received frequencies of, for example, received telecast channels are changed, and a radio communication apparatus including such an antenna device.

The antenna device according to a preferred embodiment of the present invention includes a circuit board having a communication circuit and a ground portion, an information transmitting/receiving antenna that is electrically connected to the ground portion and operates using the ground portion as a component of the information transmitting/receiving antenna, the information transmitting/receiving antenna being disposed on the circuit board, a tunable receiving antenna of a frequency-changeable type that is electrically connected to the ground portion and operates using the ground portion as a component of the tunable receiving antenna, the tunable receiving antenna being disposed on the circuit board so as to be spaced a distance from the information transmitting/receiving antenna, and a signal-band separating circuit that is disposed between the ground portion and the information transmitting/receiving antenna for separating signals in a frequency band for communication transmitted and received by the information transmitting/receiving antenna from signals in a frequency band for reception received by the tunable receiving antenna, the frequency band for reception being different from that for communication. The signal-band separating circuit is connected to the ground portion via an impedance such that the signals in the frequency band for communication are transmitted between the communication circuit and the information transmitting/receiving antenna and such that the signals in the frequency band for reception are transmitted between the information transmitting/receiving antenna and the ground portion via the impedance, and at least the antenna length of the information transmitting/receiving antenna functions as an element of the antenna length of the tunable receiving antenna such that the sensitivity of the tunable receiving antenna is compensated in the frequency band received by the tunable receiving antenna, wherein both communication with the signals in the frequency band for communication and broadcast reception with the signals in the frequency band received by the tunable antenna are provided.

Moreover, the radio communication apparatus according to another preferred embodiment of the present invention includes the above-described antenna device.

According to preferred embodiments of the present invention, the information transmitting/receiving antenna that transmits and receives the signals in the frequency band for communication and the tunable receiving antenna that receives signals in a different frequency band are separately provided. Since the information transmitting/receiving antenna and the tunable receiving antenna are disposed on the ground portion with a gap therebetween, interference of radio waves of both antennas is prevented, resulting in high-quality antenna operation. Moreover, the degradation of the characteristics of the antenna device according to the preferred embodiments of the present invention is minimal even when the antenna is reduced in size as compared to where transmission and reception of the signals in the frequency band for communication and reception of the signals in the frequency band for reception are performed using a common antenna.

Therefore, the radio communication apparatus according to the preferred embodiments of the present invention including the antenna device according to the preferred embodiments of the present invention is reduced in size while maintaining the effect of the antenna device.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention will now be described with reference to the drawings.

Figure 1:
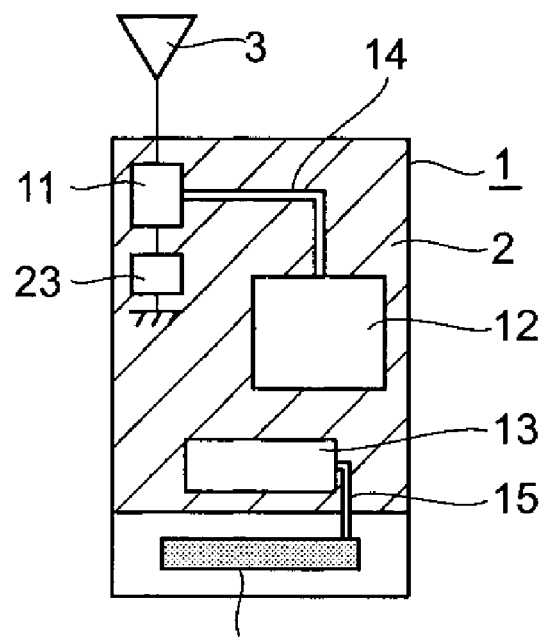
FIG. 1 illustrates the structure of an antenna device according to a first preferred embodiment of the present invention.

FIG. 1 illustrates an antenna device according to a first preferred embodiment of the present invention. In FIG. 1, a circuit board 1 includes an information transmitting/receiving antenna 3 for telephone calls (also referred to as a communication antenna 3 hereafter), a signal-band separating circuit 11, a reactance circuit 23, a ground portion 2, a signal line 14 defined by a conductive pattern, a communication circuit 12, a broadcast circuit 13, a signal line 15 defined by a conductive pattern, and a telecast-receiving antenna (broadcast antenna) 10 defined by a tunable receiving antenna. The communication antenna 3 is a type that protrudes from the circuit board 1 toward the outside. The protruding type includes, for example, whip antennas, helical antennas, and other suitable antennas. However, the communication antenna 3 may also be an embedded type. The signal-band separating circuit 11 is disposed between the communication antenna 3 and the ground portion 2. That is, the communication antenna 3 is connected to the ground portion 2 via the signal-band separating circuit 11 and the reactance circuit 23. The communication antenna 3 is used as an element of the broadcast antenna in a frequency band for broadcasts. The communication circuit 12 is connected to the signal-band separating circuit 11 via the signal line 14. The reactance circuit 23 provides an impedance between the signal-band separating circuit 11 and the ground portion 2.

The communication circuit 12 modulates signals to be transmitted in the frequency band for communication and supplies the signals to the communication antenna 3, and demodulates (detects) signals received by the communication antenna 3. Since the circuit configuration of such modulation/demodulation circuits for communication is well known, the descriptions thereof will be omitted.

The telecast-receiving antenna 10 is capable of changing frequencies to be received (expressed as a tunable antenna). Since the circuit used for making this antenna tunable does not markedly differ from those generally used in ordinary television tuners and other similar devices, the descriptions thereof will be omitted. The telecast-receiving antenna 10 is mounted on the circuit board 1 at a distance from the communication antenna 3. The ground portion 2 is interposed between the telecast-receiving antenna 10 and the communication antenna 3 so as to separate signals. In the preferred embodiment shown in FIG. 1, the telecast-receiving antenna 10 is disposed at a lower end portion of the circuit board 1 that is remote from an upper end portion of the circuit board 1 where the communication antenna 3 is located. That is, the communication antenna 3 and the telecast-receiving antenna 10 are disposed at either ends of the ground portion 2 in the longitudinal direction so as to face each other. In this specification, terms indicating positions or directions such as an upper end and a lower end are used in a configuration shown in the drawing, and do not necessarily correspond to the actual configuration. The shape of the telecast-receiving antenna 10 is not particularly limited. However, the telecast-receiving antenna 10 shown in the drawing is a dielectric antenna. This dielectric antenna includes a conductor (electrode) for receiving radio waves and a frequency-changing circuit provided on a surface of a dielectric base (a rectangular dielectric base in the drawing).

The telecast-receiving antenna 10 operates using the ground portion 2 as an element of the antenna. This telecast-receiving antenna 10 is connected to the broadcast circuit 13 via the signal line 15. The broadcast circuit 13 has a function of demodulating signals (radio waves) of telecasts, i.e., signals in the frequency band for reception, received by the telecast-receiving antenna 10. Since the circuit configuration of such a broadcast circuit 13 is well known, the descriptions of the circuit configuration will be omitted here.

Figure 2:
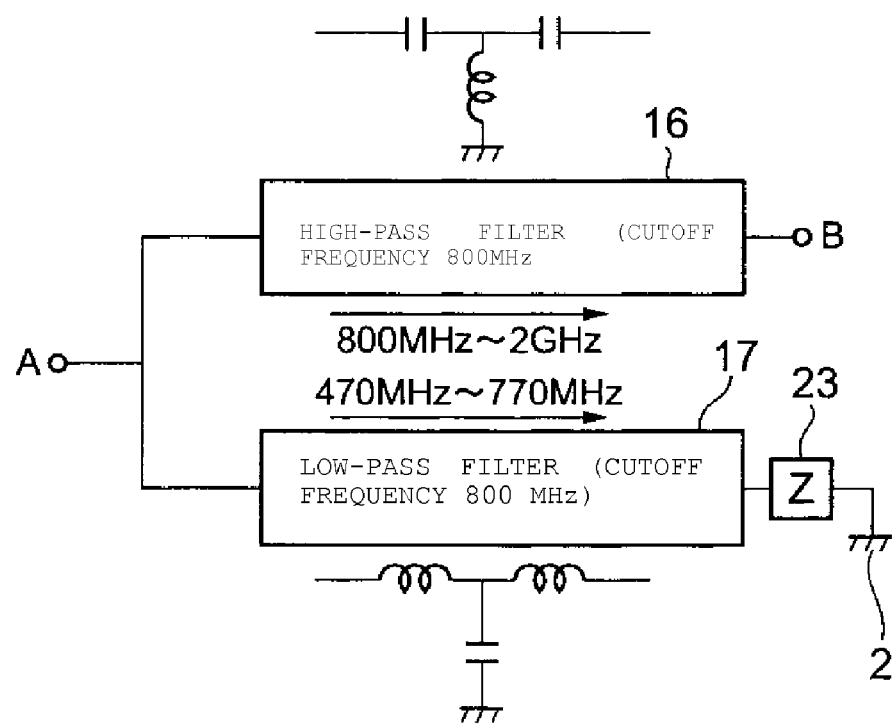
FIG. 2 illustrates a branching circuit of a signal-band separating circuit according to the first preferred embodiment of the present invention.

One of the unique features of the antenna device according to the first preferred embodiment is that the signal-band separating circuit 11 is disposed between the communication antenna 3 and the ground portion 2, and the communication antenna 3 is used as an element of the broadcast antenna in broadcast frequencies. In this preferred embodiment, the signal-band separating circuit 11 is defined by a branching circuit, and an exemplary circuit configuration of the branching circuit is shown in FIG. 2. This branching circuit includes a high-pass filter 16 and a low-pass filter 17. An end of the high-pass filter 16 and an end of the low-pass filter 17 are connected to a terminal A. The other end of the low-pass filter 17 is connected to the ground portion 2 via the reactance circuit 23 that is defined by a reactance element Z. Moreover, the other end of the high-pass filter 16 is connected to a terminal B. The terminal A is connected to the communication antenna 3, and the terminal B is connected to the communication circuit 12.

In the preferred embodiment shown in FIG. 2, the high-pass filter 16 has a cutoff frequency of, for example, about 800 MHz, and allows passage of signals in a frequency band of, for example, about 800 MHz to about 2 GHz, i.e., the signals in the frequency band for communication, and cuts off the signals in the frequency band for telecasts, which are the signals in the frequency band for reception. Moreover, the low-pass filter 17 also has a cutoff frequency of, for example, about 800 MHz, and allows passage of signals in a frequency band of, for example, about 470 MHz to about 770 GHz, i.e., the signals in the frequency band for telecasts, and cuts off (obstructs) the signals in the frequency band for communication.

According to this first preferred embodiment, the branching circuit defining the signal-band separating circuit 11 is disposed between the communication antenna 3 and the ground portion 2. Therefore, the signals in the frequency band for communication are transmitted between the communication antenna 3 and the communication circuit 12 by the signal-band separating circuit 11. In the frequency band for telecasts, the communication antenna 3 is connected to the ground portion 2 via a phase of the branching circuit and the reactance element Z. At this time, the signals in the frequency band for communication flow between the communication antenna 3 and the communication circuit 12 via the signal-band separating circuit 11. The telecast-receiving antenna 10 operates using the antenna 10 thereof, the ground portion 2, and the communication antenna 3 as elements thereof via the signal-band separating circuit 11.

The communication antenna 3 operates with a total antenna length (total electrical length) including the antenna length (electrical length) of the communication antenna 3 and the antenna length (electrical length) of the ground portion 2. In this case, the total antenna length including the antenna length (electrical length) of the communication antenna 3 and the antenna length (electrical length) of the ground portion 2 may be shorter than the ideal length ($\lambda/2$: $\lambda$ is a signal wavelength) as the antenna device is reduced in size, and the antenna characteristics may be degraded. In such a case, measures for compensating for the antenna length as disclosed in Patent Documents 1 to 3 are required. On the other hand, the telecast-receiving antenna 10 operates with a total antenna length including the antenna length of the telecast-receiving antenna 10, the antenna length of the ground portion 2, and the antenna length of the communication antenna 3.

In this manner, the telecast-receiving antenna 10 operates using the antenna length of the communication antenna 3 in addition to that of the ground portion 2. Therefore, the antenna length is sufficiently long (an effect similar to that when the antenna of the telecast-receiving antenna 10 is elongated is obtained), and the telecast-receiving antenna operates while the antenna characteristics for the signals in the frequency band for telecasts, which have lower frequencies and range in a wider frequency band than the signals in the frequency band for communication, are maintained to have good characteristics (where the frequency characteristic, the gain, and other characteristics are improved). As a result, the quality of the received signals in the frequency band for telecasts is improved. In particular, the radio field intensity of airwaves at the telecast-receiving antenna 10 of a cellular phone is lower than those at Yagi antennas and other similar antennas, since the cellular phone is used at a lower position than Yagi antennas and other similar antennas that are provided on, for example, roofs of buildings. In this context, high-efficiency antenna characteristics are required. The structure according to this preferred embodiment sufficiently satisfies the demand for the high-efficiency antenna characteristics.

Figure 3:
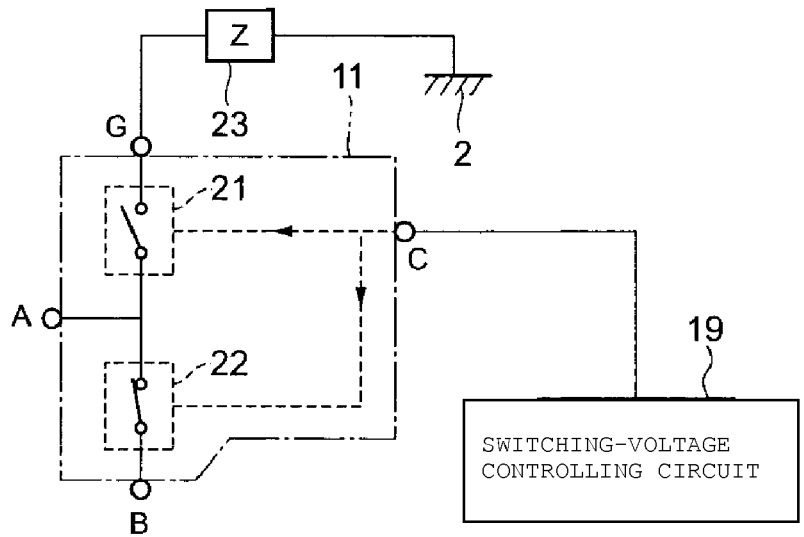
FIG. 3 illustrates the structure of principal components of an antenna device according to a second preferred embodiment of the present invention.

FIG. 3 illustrates the structure of principal components of an antenna device according to a second preferred embodiment of the present invention. In this second preferred embodiment, the signal-band separating circuit 11 is defined by a switching circuit, and structures other than the switching circuit and the related components are similar to those in the first preferred embodiment. In the preferred embodiment shown in FIG. 3, the switching circuit includes switching elements 21 and 22 connected in series.

The terminal A provided at the connecting portion of the switching element 21 and the switching element 22 that are connected in series is connected to the communication antenna 3. A terminal G adjacent to the other end of the switching element 21 is connected to the ground portion 2 via the reactance element Z. A terminal B adjacent to the other end of the switching element 22 is connected to the communication circuit 12. A switching-voltage controlling circuit 19 is provided on the circuit board 1. The switching-voltage controlling circuit (switch-controlling circuit) 19 connects the terminal A with the terminal B during communication, and connects the terminal A with the terminal G during broadcast reception.

Figure 4:
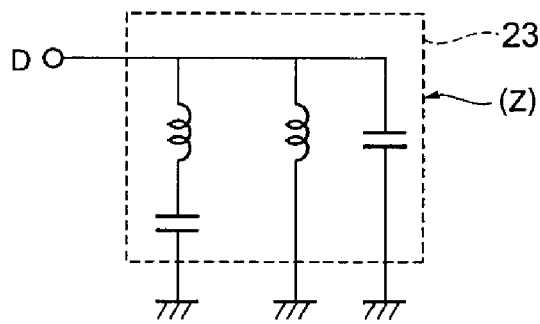
FIG. 4 illustrates the structure of principal components of an antenna device according to a third preferred embodiment of the present invention.

Next, an antenna according to a third preferred embodiment of the present invention will be described. In this third preferred embodiment, the reactance circuit 23 is configured to have multiple resonant frequencies, and structures other than this are similar to those in the first preferred embodiment. FIG. 4 illustrates the structure of the multi-resonant reactance circuit 23. Descriptions of techniques for designing the reactance circuit 23 are omitted since values of the elements vary according to frequencies and functions to be used. The circuit Z configured to have multiple resonant frequencies is designed so as to enhance the sensitivity in the wide frequency band for broadcasts.

Figure 5:
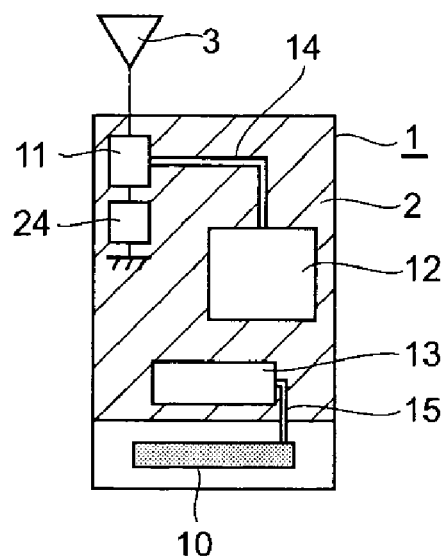
FIG. 5 illustrates the structure of an antenna device according to a fourth preferred embodiment of the present invention.
Figure 6:
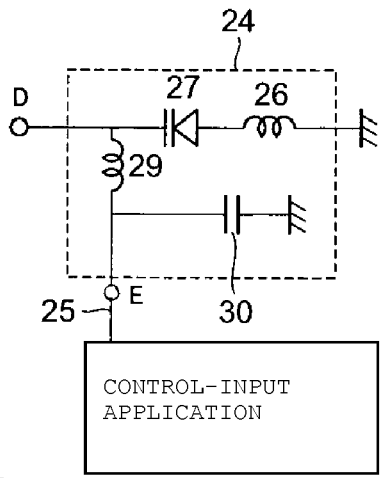
FIG. 6 illustrates a variable-reactance circuit 24 according to the fourth preferred embodiment of the present invention.

FIG. 5 illustrates an antenna device according to a fourth preferred embodiment of the present invention. In this fourth preferred embodiment, a variable-reactance circuit 24 is used instead of the reactance circuits 23 shown in FIGS. 1 to 4. The reactance of the variable-reactance circuit 24 is changed, or switched and adjusted when television channels are changed. Furthermore, an input-controlling circuit 40 (see FIG. 6) for applying a control input to the variable-reactance circuit 24 is provided on the circuit board 1. Structures other than these are similar to those in the first to third preferred embodiments. FIG. 6 specifically illustrates an exemplary circuit configuration of the variable-reactance circuit 24. The variable-reactance circuit 24 includes inductors 26 and 29, a capacitor 30, and a variable-capacitance diode 27. A terminal D of the variable-reactance circuit 24 is connected to the signal-band separating circuit 11, and a terminal E thereof functions as an input end for control voltage.

The variable-reactance circuit 24 changes the capacitance of the variable-capacitance diode 27 in accordance with the voltage, which serves as the control input, that is input to the input end E for operating voltage, and thereby changes the reactance of the entire variable-reactance circuit 24. As a result, the reactance required for the optimum antenna length (electrical length) is generated by the variable-reactance circuit 24. Furthermore, this improves the efficiency of the broadcast antenna. The variable-reactance circuit 24 may be a switching type (reactance-switching type) using switching diodes or FETs.

In this fourth preferred embodiment, the efficiency of the telecast-receiving antenna 10 is improved by changing the reactance in accordance with changes in frequencies. Similarly, when the television channel (received frequency) is changed, the efficiency can also be improved by changing the reactance in response to the changed channel (received frequency). That is, when the television channel (received frequency) is changed, the operating voltage applied to the input end E for the operating voltage is changed according to the changed channel. With this, the voltage applied to the variable-capacitance diode 27 is changed, and the capacity of the variable-capacitance diode 27 is changed in response to the voltage change. As a result, the reactance of the variable-reactance circuit 24 is set to a value with which the antenna length (electrical length of the antenna) is the most suitable for the frequency of the telecast of the changed channel in response to the channel change. That is, the reactance of the variable-reactance circuit 24 is set such that the frequency of the received channel (received frequency) after the channel change is equal to the resonant frequency of the variable-reactance circuit 24. Therefore, the antenna characteristics are not degraded even when the television channel is changed, and high-quality telecasts are received with optimum high-efficiency (high-sensitivity) antenna characteristics on every channel.

Figure 7A:
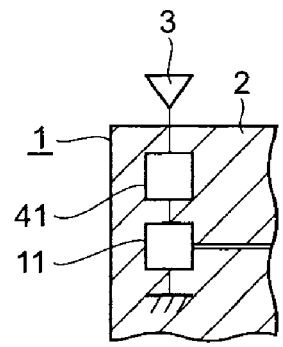
FIG. 7A illustrates the structure of an antenna device according to a fifth preferred embodiment of the present invention.
Figure 7B:
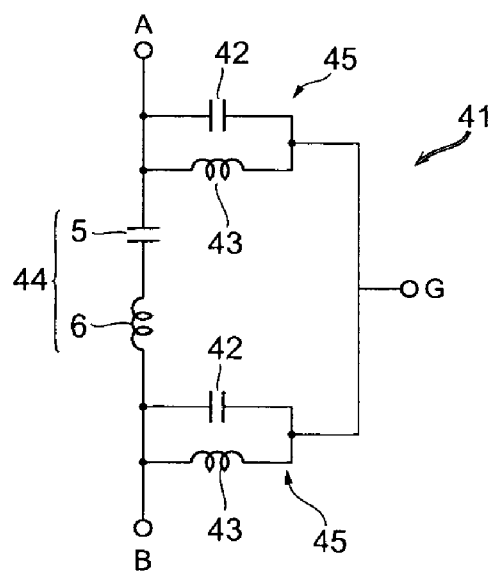
FIG. 7B illustrates a circuit configuration of a phase shifter 41 shown in FIG. 7A.

Next, a fifth preferred embodiment of the present invention will be described. In this fifth preferred embodiment, a phase shifter 41 is interposed between the communication antenna 3 and the signal-band separating circuit 11 as shown in FIG. 7A for controlling phase displacement such that the sensitivity of the broadcast antenna is improved. An exemplary phase-shifting circuit of the phase shifter 41 is shown in FIG. 7B. The terminal A of the phase-shifting circuit is connected to the communication antenna 3, and the terminal B is connected to the signal-band separating circuit 11. The terminal A and the terminal B are connected to each other via an LC series resonance circuit 44. The LC series resonance circuit 44 includes a capacitor 5 and an inductance element 6 connected in series. First ends of the LC parallel resonance circuits 45 are connected between an end of the LC series resonance circuit 44 and the terminal A and between the other end of the LC series resonance circuit 44 and the terminal B, and second ends of the LC parallel resonance circuits 45 are connected to the terminal G. The terminal A is connected to the communication antenna 3, and the terminal B is connected to the signal-band separating circuit 11.

As described above, according to the preferred embodiments of the present invention, the signals in the frequency band for communication are transmitted between the communication circuit 12 and the communication antenna 3 via the branching circuit or the switching circuit serving as the signal-band separating circuit 11. The signals in the frequency band for reception are transmitted from the telecast-receiving antenna 10 to the receiving circuit thereof (broadcast circuit 3). At this time, the tunable receiving antenna 10 utilizes the ground portion 2 and the communication antenna 3 to improve the antenna sensitivity. Therefore, the communication antenna 3 can be used as an element of the telecast-receiving antenna 10 even in the case of a small antenna and a small radio communication apparatus, and thus, the total antenna length including the tunable receiving antenna 10, the ground portion 2, and the information transmitting/receiving antenna 3 can be set to an ideal or substantially ideal value. Accordingly, the antenna characteristics of the tunable receiving antenna are effectively improved.

Moreover, according to the first to third preferred embodiments of the present invention, the reactance circuit 23 that applies an impedance between the signal-band separating circuit 11 and the ground portion 2 is provided such that the total antenna length (electrical length of the antenna) including the telecast-receiving antenna (broadcast antenna) 10, the ground portion 2, and the information transmitting/receiving antenna 3 is adjusted and set to an appropriate value according to the reactance of the reactance circuit 23. The antenna characteristics of the tunable receiving antenna 10 are further improved with the reactance.

In particular, in the preferred embodiment where the variable-reactance circuit 24 that applies an impedance between the signal-band separating circuit 11 and the ground portion 2 by changing the reactance according to the control input is interposed between the signal-band separating circuit 11 and the ground portion 2 as shown in FIGS. 5 and 6, the variable-reactance circuit 24 generates a reactance so as to resonate at the frequency received by the tunable receiving antenna 10. That is, the variable-reactance circuit 24 is synchronized with the circuit that determines the control input to the variable-reactance circuit (input-controlling circuit 40), the control input driving the variable-reactance circuit to resonate at the frequency received by the tunable receiving antenna 10. The variable-reactance circuit 24 receives the control input according to the received frequency after the frequency change from the circuit that determines the control input (input-controlling circuit 40) every time the received frequency is changed, and generates a reactance in response to the control input. With this structure, the antenna characteristics of the tunable receiving antenna 10 are not degraded or changed even when the received frequency of the signals in the frequency band for reception is changed, and the tunable receiving antenna 10 can receive signals with excellent antenna characteristics even when the received frequency of the signals in the frequency band for reception is changed.

Figure 8:
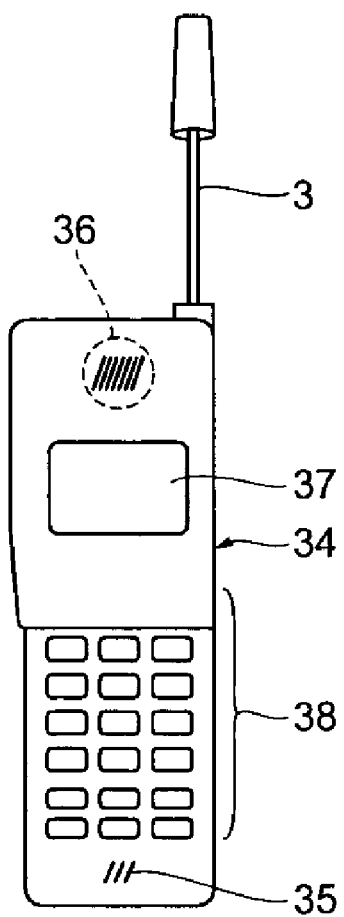
FIG. 8 illustrates an external view of a radio communication apparatus according to another preferred embodiment of the present invention.

FIG. 8 illustrates a radio communication apparatus according to another preferred embodiment of the present invention. Cellular phones are a known type of radio communication apparatuses. A cellular phone will be described below as a typical example of radio communication apparatuses. In FIG. 8, an antenna device according to any one of the above-described preferred embodiments is installed in a housing 34, and a communication antenna 3 protrudes toward the outside of the housing 34. This communication antenna 3 may be extended and contracted, or may have a fixed length. The housing 34 may be of a folded type (collapsible type), or may be of a slidable type, a flexible type, or any other suitable type, instead of the collapsible type. A telecast-receiving antenna 10 is an embedded type mounted on a circuit board 1, and is accommodated in the housing 34.

A speaker 36 and a microphone 35 are disposed inside the housing 34, and through-holes such as slits allowing sound to pass therethrough are provided in the housing 34 at the appropriate locations. The housing 34 has an operating portion 38 where buttons, touch panels, or other suitable controls required for calling and receiving telecasts are disposed. Moreover, the housing 34 has a display 37, such as a liquid-crystal screen. Television pictures are displayed on the display 37, and operating information of the operating portion 38 or information on telephone calls is also displayed on the display 37 as required. Although not shown, a battery for power supply is accommodated in the housing 34, and the cellular phone (radio communication apparatus) includes a circuit configuration capable of communicating and receiving telecasts.

Figure 9A:
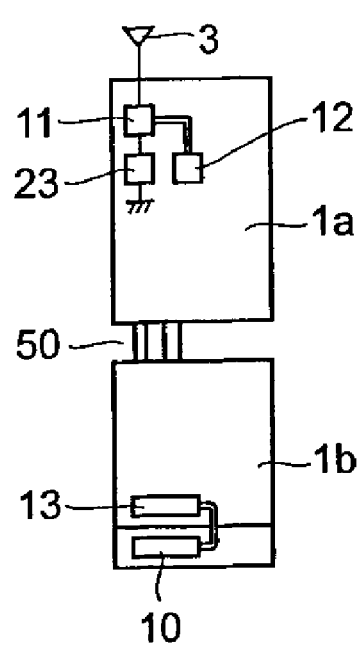
FIG. 9A illustrates an exemplary layout of a communication antenna 3 and a telecast-receiving antenna 10 in the radio communication apparatus of a collapsible type.
Figure 9B:
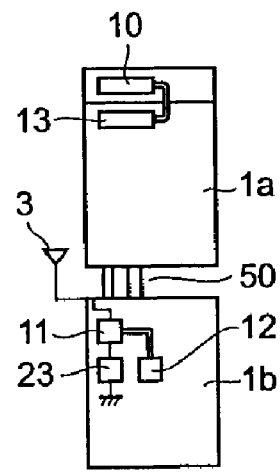
FIG. 9B illustrates another exemplary layout of the communication antenna 3 and the telecast-receiving antenna 10 in the radio communication apparatus of the collapsible type.
Figure 9C:
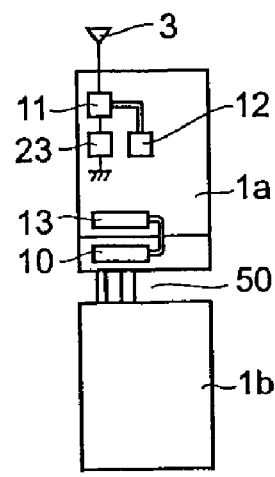
FIG. 9C illustrates yet another exemplary layout of the communication antenna 3 and the telecast-receiving antenna 10 in the radio communication apparatus of the collapsible type.
Figure 10:
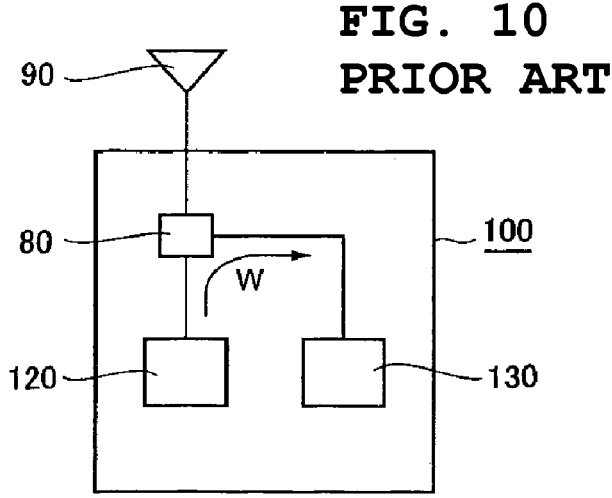
FIG. 10 illustrates an exemplary structure of an antenna device including an information transmitting/receiving antenna and a telecast-receiving antenna.

FIGS. 9A, 9B, and 9C illustrate exemplary layouts of various antennas in the radio communication apparatus (cellular phone) of a collapsible type according to this preferred embodiment of the present invention. A circuit board 1a is accommodated in one portion of the collapsible housing, and a circuit board 1b is accommodated in the other portion of the collapsible housing. The circuit board 1a and the circuit board 1b are electrically connected to each other via a plurality of wires 50. In FIG. 9A, the communication antenna 3 is disposed on the circuit board 1a, and the telecast-receiving antenna 10 is disposed on the circuit board 1b, whereas the telecast-receiving antenna 10 is disposed on the circuit board 1a and the communication antenna 3 is disposed on the circuit board 1b in FIG. 9B. In FIG. 9C, the communication antenna 3 and the telecast-receiving antenna 10 are disposed together on the circuit board 1a. The communication antenna 3 and the telecast-receiving antenna 10 may also be disposed together on the circuit board 1b.

The radio communication apparatus according to this preferred embodiment includes the antenna device according to any one of the above-described preferred embodiments of the present invention. Thus, the radio communication apparatus benefits from the effects of the antenna device, and is capable of both high-quality communication and telecast reception.

The present invention is not limited to the structures of the above-described embodiments, and various modifications can be made and used. For example, the telecast-receiving antenna 10 is preferably a dielectric antenna in the above-described preferred embodiments. However, the telecast-receiving antenna 10 may be an antenna other than a dielectric antenna. The occupied bandwidth of one telecast channel is 6 MHz, and the S/N ratio is improved when frequencies outside the occupied bandwidth are not received, thereby leading to high-quality telecast reception. That is, antennas having higher Q factors are suitable for telecast-receiving antennas. In view of this, dielectric antennas have high Q factors, and thus, it is preferred that the telecast-receiving antenna 10 be a dielectric antenna. Moreover, when the telecast-receiving antenna is a dielectric antenna, the size of the antenna can be further reduced due to the effect of the wavelength being shortened (effect of lowering the resonant frequency of the antenna) by the dielectric.

The switching circuit preferably has the circuit configuration shown in FIG. 3 in the second preferred embodiment. However, the circuit configuration of the switching circuit is not limited to that shown in the drawing, and any other circuits may be used as long as the switching circuit connects the communication antenna 3 with the communication circuit 12 when communication is required and switches the connection such that the communication antenna 3 is connected to the ground portion 2 at other times.

Furthermore, the variable-reactance circuit preferably has the circuit configuration shown in FIG. 6 in the fourth preferred embodiment. However, any other circuits may be used as long as the reactance of the variable-reactance circuit is changed in response to the control input. A substitute variable-reactance circuit may utilize a physical quantity such as current as the control input for changing the reactance instead of voltage.

In addition, the signal-band separating circuit 11 is preferably defined by the branching circuit or the switching circuit in the above-described preferred embodiments. However, the circuit configuration is not limited to those shown in the above-described preferred embodiments, and any other circuits may be used as long as the signal-band separating circuit 11 transmits the signals in the frequency band for communication between the communication antenna 3 and the communication circuit 12, and transmits the signals in the frequency band for telecasts between the communication antenna 3 and the ground portion 2.

In the above-described preferred embodiments, the communication antenna 3 and the telecast-receiving antenna 10 may be disposed on a common ground portion of the circuit board 1, or may be disposed on separate ground portions. When the communication antenna 3 and the telecast-receiving antenna 10 are disposed on the separate ground portions, the ground portion on which the communication antenna 3 is disposed is electrically connected with the ground portion on which the telecast-receiving antenna 10 is disposed by a signal line as required.

The phase shifter 41 is preferably defined by a combined circuit of the series resonance circuit 44 and the parallel resonance circuits 45 in the fifth preferred embodiment. However, the phase shifter 41 may have other circuit configurations. In this case, the terminal impedance may be configured to be changed according to the received telecast channel as shown in FIG. 6, for example, such that the optimum terminal impedance can be obtained according to the received channel, and thus, the antenna characteristics that are the best suited for all received channels can be obtained. Furthermore, such a phase shifter 41 may be disposed on either or both of a line between the communication antenna 3 and the signal-band separating circuit 11 and a line between the signal-band separating circuit 11 and the ground portion 2 in the first to third preferred embodiments. In this case, the line on which the phase shifter 41 is disposed is divided at a portion. The terminal A of the phase shifter 41 may be connected to an end of the divided portion, and the terminal B of the phase shifter 41 may be connected to the other end of the divided portion, such that both ends of the divided portion are electrically connected by the phase shifter 41.

Although not shown in the above-described preferred embodiments, a matching circuit for matching the impedance of the information transmitting/receiving antenna and the impedance of the modulation/demodulation circuit for communication, the impedances being viewed from the location of the matching circuit, may be disposed at a location between the communication antenna 3 and the communication circuit 12.

Signals in a frequency band for telephone calls are described as an example of the signals in the frequency band for communication in the above-described preferred embodiments. However, the signals in the frequency band for communication may also include various signals in a frequency band for, for example, data transmission capable of bidirectional communication of transmission and reception other than telephone calls in other preferred embodiments of the present invention. Moreover, signals in a frequency band for telecasts are described as an example of the signals in the frequency band for reception in the above-described preferred embodiments. However, the signals in the frequency band for reception may include various signals in a frequency band for, for example, GPSs other than telecasts in other preferred embodiments of the present invention.

The radio communication apparatus according to preferred embodiments of the present invention is not limited to a cellular phone, and may also be applied to various radio communication apparatuses that include information transmitting/receiving antennas and tunable receiving antennas, for example, mobile computers or in-car radio communication apparatuses.

Preferred embodiments of the present invention are suitable for use in transmitting/receiving radio waves for communication and receiving radio waves of broadcasts.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An antenna device comprising:
   a circuit board including a communication circuit and a ground portion;
   an information transmitting/receiving antenna electrically connected to the ground portion and operating using the ground portion as an element of the information transmitting/receiving antenna, the information transmitting/receiving antenna being disposed on the circuit board;
   a tunable receiving antenna of a frequency-changeable type electrically connected to the ground portion and operating using the ground portion as an element of the tunable receiving antenna, the tunable receiving antenna being disposed on the circuit board at a distance from the information transmitting/receiving antenna; and
   a signal-band separating circuit disposed between the ground portion and the information transmitting/receiving antenna for separating signals in a frequency band for communication transmitted and received by the information transmitting/receiving antenna from signals in a frequency band for reception received by the tunable receiving antenna, the frequency band for reception being different from the frequency band for communication; wherein
   the signal-band separating circuit is connected to the ground portion via an impedance such that the signals in the frequency band for communication are transmitted between the communication circuit and the information transmitting/receiving antenna and such that the signals in the frequency band for reception are transmitted between the information transmitting/receiving antenna and the ground portion via the impedance, and at least the antenna length of the information transmitting/receiving antenna functions as a part of the antenna length of the tunable receiving antenna such that the sensitivity of the tunable receiving antenna is compensated in the frequency band received by the tunable receiving antenna; and both communication with the signals in the frequency band for communication and broadcast reception with the signals in the frequency band received by the tunable antenna are provided.

2. The antenna device according to claim 1, wherein the signal-band separating circuit is a branching circuit and the branching circuit transmits the signals in the frequency band for communication between the communication circuit and the information transmitting/receiving antenna, and transmits the signals in the frequency band for reception between the ground portion and the information transmitting/receiving antenna via a reactance element that applies an impedance between the ground portion and the information transmitting/receiving antenna.

3. The antenna device according to claim 1, wherein the signal-band separating circuit is a switching circuit and the switching circuit connects the tunable receiving antenna to the ground portion with an impedance that improves the sensitivity of the antenna during an operation mode where a receiving circuit of the tunable receiving antenna is operated, and switches the connection such that the information transmitting/receiving antenna is connected to the communication circuit in other operation modes.

4. The antenna device according to claim 1, wherein a reactance circuit that applies an impedance between the signal-band separating circuit and the ground portion is provided between the signal-band separating circuit and the ground portion, and the reactance circuit has a reactance that is changed or switched according to the frequency of the tunable receiving antenna.

5. The antenna device according to claim 2, wherein a reactance circuit that applies an impedance between the signal-band separating circuit and the ground portion is provided between the signal-band separating circuit and the ground portion, and the reactance circuit has a reactance that is changed or switched according to the frequency of the tunable receiving antenna.

6. The antenna device according to claim 3, wherein a reactance circuit that applies an impedance between the signal-band separating circuit and the ground portion is provided between the signal-band separating circuit and the ground portion, and the reactance circuit has a reactance that is changed or switched according to the frequency of the tunable receiving antenna.

7. The antenna device according to claim 1, wherein a variable-reactance circuit applying an impedance between the signal-band separating circuit and the ground portion by changing the reactance in response to a control input is interposed between the signal-band separating circuit and the ground portion, and the variable-reactance circuit is synchronized with a circuit for determining the control input applied to the variable-reactance circuit that generates a reactance so as to resonate at a frequency received by the tunable receiving antenna, thereby the variable-reactance circuit receives the control input depending on the received frequency after the frequency change from the circuit for determining the control input every time the received frequency is changed, and generates the reactance in accordance with the control input.

8. The antenna device according to claim 2, wherein a variable-reactance circuit applying an impedance between the signal-band separating circuit and the ground portion by changing the reactance in response to a control input is interposed between the signal-band separating circuit and the ground portion, and the variable-reactance circuit is synchronized with a circuit for determining the control input applied to the variable-reactance circuit that generates a reactance so as to resonate at a frequency received by the tunable receiving antenna, thereby the variable-reactance circuit receives the control input depending on the received frequency after the frequency change from the circuit for determining the control input every time the received frequency is changed, and generates the reactance in accordance with the control input.

9. The antenna device according to claim 4, wherein a variable-reactance circuit applying an impedance between the signal-band separating circuit and the ground portion by changing the reactance in response to a control input is interposed between the signal-band separating circuit and the ground portion, and the variable-reactance circuit is synchronized with a circuit for determining the control input applied to the variable-reactance circuit that generates a reactance so as to resonate at a frequency received by the tunable receiving antenna, thereby the variable-reactance circuit receives the control input depending on the received frequency after the frequency change from the circuit for determining the control input every time the received frequency is changed, and generates the reactance in accordance with the control input.

10. The antenna device according to claim 5, wherein a variable-reactance circuit applying an impedance between the signal-band separating circuit and the ground portion by changing the reactance in response to a control input is interposed between the signal-band separating circuit and the ground portion, and the variable-reactance circuit is synchronized with a circuit for determining the control input applied to the variable-reactance circuit that generates a reactance so as to resonate at a frequency received by the tunable receiving antenna, thereby the variable-reactance circuit receives the control input depending on the received frequency after the frequency change from the circuit for determining the control input every time the received frequency is changed, and generates the reactance in accordance with the control input.

11. The antenna device according to claim 6, wherein a variable-reactance circuit applying an impedance between the signal-band separating circuit and the ground portion by changing the reactance in response to a control input is interposed between the signal-band separating circuit and the ground portion, and the variable-reactance circuit is synchronized with a circuit for determining the control input applied to the variable-reactance circuit that generates a reactance so as to resonate at a frequency received by the tunable receiving antenna, thereby the variable-reactance circuit receives the control input depending on the received frequency after the frequency change from the circuit for determining the control input every time the received frequency is changed, and generates the reactance in accordance with the control input.

12. The antenna device according to claim 1, wherein a reactance circuit that applies impedance between the signal-band separating circuit and the ground portion is interposed between the signal-band separating circuit and the ground portion, and the reactance circuit has multiple resonant frequencies.

13. The antenna device according to claim 2, wherein a reactance circuit that applies impedance between the signal-band separating circuit and the ground portion is interposed between the signal-band separating circuit and the ground portion, and the reactance circuit has multiple resonant frequencies.

14. The antenna device according to claim 1, wherein the information transmitting/receiving antenna and the tunable receiving antenna are disposed on separate ground portions, and the separate ground portions are connected to each other by a signal line.

15. The antenna device according to claim 1, wherein the tunable receiving antenna is a dielectric antenna having an antenna electrode disposed on a dielectric base.

16. A radio communication apparatus equipped with an antenna device including an information transmitting/receiving antenna and a tunable receiving antenna, wherein the antenna device is an antenna device according to claim 1.

* * * * *